United States Patent
Isonaga (10) Patent No.: US 10,230,886 B2
(45) Date of Patent: Mar. 12, 2019

(54) IMAGE PICKUP APPARATUS TO CAPTURE A SELF IMAGE

(71) Applicant: SONY CORPORATION, Tokyo (JP)

(72) Inventor: Yasuaki Isonaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/325,689

(22) PCT Filed: May 22, 2015

(86) PCT No.: PCT/JP2015/002583
§ 371 (c)(1),
(2) Date: Jan. 11, 2017

(87) PCT Pub. No.: WO2016/017054
PCT Pub. Date: Feb. 4, 2016

(65) Prior Publication Data
US 2017/0171455 A1  Jun. 15, 2017

(30) Foreign Application Priority Data

Jul. 30, 2014 (JP) .................................. 2014-154436

(51) Int. Cl.
*H04N 5/232* (2006.01)
*G02B 17/08* (2006.01)
(Continued)

(52) U.S. Cl.
CPC ....... *H04N 5/23209* (2013.01); *G02B 17/086* (2013.01); *G03B 15/02* (2013.01);
(Continued)

(58) Field of Classification Search
CPC ............ H04N 5/23209; H04N 5/2256; H04N 5/2252; G03B 17/561; G03B 15/02; G03B 17/12; G02B 17/086
(Continued)

(56) References Cited

U.S. PATENT DOCUMENTS

| | | | |
|---|---|---|---|
| 5,343,376 A | 8/1994 | Huang | |
| 7,658,557 B2 * | 2/2010 | Lu | G03B 19/00 348/207.1 |

(Continued)

FOREIGN PATENT DOCUMENTS

| | | |
|---|---|---|
| CN | 101398527 A | 4/2009 |
| JP | 58-193530 A | 11/1983 |

(Continued)

OTHER PUBLICATIONS

Office Action for JP Patent Application No. 2014-154436, dated Oct. 16, 2018, 7 pages of Office Action and 34 pages of English Translation.

(Continued)

*Primary Examiner* — Lin Ye
*Assistant Examiner* — Chan T Nguyen
(74) *Attorney, Agent, or Firm* — Chip Law Group (57) ABSTRACT

[Object] To provide an image pickup apparatus suited for self-shooting. [Solving Means] An image pickup apparatus according to an embodiment of the present technology includes a main body and a movable unit. The main body includes a lens tube portion. The movable unit includes a movable portion and a bias portion that biases the movable portion toward the lens tube portion, the movable portion having a relative position with respect to the lens tube portion being variable along an axial direction orthogonal to an optical axis of the lens tube portion.

14 Claims, 11 Drawing Sheets

(51) Int. Cl.
  *G03B 17/12* (2006.01)
  *G03B 17/02* (2006.01)
  *G03B 17/04* (2006.01)
  *H04N 5/225* (2006.01)
  *G03B 15/02* (2006.01)
  *G03B 17/56* (2006.01)
  *G03B 15/05* (2006.01)

(52) U.S. Cl.
  CPC ............ *G03B 17/02* (2013.01); *G03B 17/04* (2013.01); *G03B 17/12* (2013.01); *G03B 17/561* (2013.01); *G03B 17/563* (2013.01); *G03B 17/566* (2013.01); *H04N 5/225* (2013.01); *H04N 5/2252* (2013.01); *H04N 5/2256* (2013.01); *G03B 15/05* (2013.01); *H04N 5/23293* (2013.01)

(58) Field of Classification Search
  USPC .................................................. 348/373–375
  See application file for complete search history.

(56) References Cited

U.S. PATENT DOCUMENTS

| | | | | |
|---|---|---|---|---|
| 2011/0080563 | A1* | 4/2011 | Greaves | F16M 11/123 352/243 |
| 2013/0230309 | A1* | 9/2013 | Porter | G02B 21/36 396/432 |
| 2014/0313358 | A1* | 10/2014 | Yu | H04N 5/23203 348/211.7 |
| 2015/0127486 | A1* | 5/2015 | Advani | G06Q 30/0241 705/26.41 |
| 2016/0097968 | A1* | 4/2016 | Hunt | H04N 5/2254 396/530 |
| 2016/0156816 | A1* | 6/2016 | Brown | G03B 17/565 348/335 |

FOREIGN PATENT DOCUMENTS

| | | |
|---|---|---|
| JP | 04-161940 A | 6/1992 |
| JP | 10-200834 A | 7/1998 |
| JP | 2001-159805 A | 6/2001 |
| JP | 2002-262308 A | 9/2002 |
| JP | 2006-084807 A | 3/2006 |
| JP | 2006-148345 A | 6/2006 |
| JP | 2007-312297 A | 11/2007 |
| JP | 2008-118482 | 5/2008 |
| JP | 2008-118482 A | 5/2008 |
| JP | 2008-139727 A | 6/2008 |
| JP | 2013-037085 A | 2/2013 |
| JP | 2013-229854 A | 11/2013 |
| JP | 5541429 B1 | 7/2014 |
| WO | 2014/112371 A1 | 7/2014 |

OTHER PUBLICATIONS

Office Action for CN Patent Application No. 201580039961.6, dated Nov. 5, 2018, 5 pages of Office Action and 7 pages of English Translation.

* cited by examiner

IMAGE PICKUP APPARATUS TO CAPTURE A SELF IMAGE

CROSS REFERENCE TO RELATED APPLICATIONS

This application is a U.S. National Phase of International Patent Application No. PCT/JP2015/002583 filed on May 22, 2015, which claims priority benefit of Japanese Patent Application No. JP 2014-154436 filed in the Japan Patent Office on Jul. 30, 2014. Each of the above-referenced applications is hereby incorporated herein by reference in its entirety.

TECHNICAL FIELD

The present technology relates to an image pickup apparatus.

BACKGROUND ART

In recent years, self-shooting (selfie) in which a user photographs him/herself as an object has become popular owing to developments of social media, and a demand for an image pickup apparatus with which users can comfortably perform self-shooting is increasing. For example, Patent Document 1 discloses a flip phone and a touch-panel-type mobile terminal including a camera for self-shooting.

Patent Document 1: Japanese Patent Application Laid-open No. 2013-229854

SUMMARY

Problem to be Solved

In recent years, there is a growing need for an image pickup apparatus such as a digital still camera that enables self-shooting to be performed by a user him/herself. However, it is currently the case that existing image pickup apparatuses do not include functions suited for self-shooting.

In view of the circumstances as described above, the present technology aims at providing an image pickup apparatus suited for self-shooting.

Means for Solving the Problem

According to an embodiment of the present technology, there is provided an image pickup apparatus including a main body and a movable unit.

The main body includes a lens tube portion.

The movable unit includes a movable portion and a bias portion that biases the movable portion toward the lens tube portion, the movable portion having a relative position with respect to the lens tube portion being variable along an axial direction orthogonal to an optical axis of the lens tube portion.

According to the image pickup apparatus, a member to be attached, which is capable of displaying an object image, for example, can be interposed between the lens tube portion and the movable portion. In addition, since the movable unit includes a bias mechanism, the member to be attached can be held stably. With this configuration, a user can photograph while checking an image to be taken on the member to be attached, which displays the image pickup direction. As a result, images that the user desires can be obtained by self-shooting.

A typical example of the member to be attached is an electronic apparatus capable of receiving an object image from the image pickup apparatus, such as a display apparatus and a mobile terminal. Other than those above, a product including a mirror surface capable of presenting to the user his/her own image may be used.

The main body may further include a casing portion. The casing portion has a longitudinal direction in the axial direction orthogonal to the optical axis and is capable of accommodating the movable portion.

The lens tube portion may be provided at one of end portions of the casing portion in the longitudinal direction, and the movable portion may be provided at the other one of the end portions of the casing portion in the longitudinal direction.

The movable portion may be configured by a shaft-like member. The shaft-like member has a longitudinal direction in the axial direction orthogonal to the optical axis and is movable along the second axial direction. The bias portion may include an elastic member fixed between the shaft-like member and the casing.

The movable portion may further include an engagement portion and may be movable between a first position at which the engagement portion engages with the other one of the end portions and a second position at which the engagement portion is positioned apart from the other one of the end portions in the axial direction orthogonal to the optical axis.

With this configuration, since the engagement portion engages with the other one of the end portions at the first position, it becomes possible to prevent the movable portion from making improper movements. Moreover, since the second position is determined based on the size of the member to be attached when the member to be attached is held by the movable portion and the bias mechanism, for example, the member to be attached can be held disregard the size thereof.

The engagement portion may be configured to be switchable between a first posture at which the engagement portion engages with the other one of the end portions at the first position and a second posture at which the engagement portion can hold a member to be attached in cooperation with the lens tube portion at the second position.

With this configuration, since the second posture is a posture opposing the axial direction orthogonal to the optical axis, the member to be attached can be held more effectively.

The lens tube portion may include a lens and a mirror surface portion in a circumference of the lens. The mirror surface portion may be an annular convex mirror portion that is convex in an image pickup direction. With this configuration, by visually checking the convex mirror portion, the relative position between the user and the lens tube portion can be checked.

The lens tube portion may further include a light-emitting portion that irradiates light in an image pickup direction.

The main body may further include a photograph operation portion that is provided on a surface in a direction different from an image pickup direction.

The main body may further include a tripod hole formed at an end portion thereof on the other side of an end portion connected to the lens tube portion.

A communication unit capable of transmitting captured data to an external display apparatus may be further included.

The movable portion may further include a holding portion capable of holding the external display apparatus in cooperation with the lens tube portion.

According to another embodiment of the present technology, there is provided an image pickup apparatus including an image pickup unit and an attachment portion.

The image pickup unit includes a lens tube portion.

The attachment portion is movable along an axial direction orthogonal to an optical axis of the lens tube portion, includes a holding portion capable of holding a member to be attached in cooperation with the lens tube portion, and is connected to the image pickup unit.

Effects

As described above, according to the present technology, images that a user desires can be obtained by self-shooting. It should be noted that the effects described herein are not necessarily limited, and any effect described in the present technology may be obtained.

DESCRIPTION OF PREFERRED EMBODIMENTS

Hereinafter, an embodiment of the present technology will be described with reference to the drawings.

[Overall Configuration of Image Pickup Apparatus]

Figure 1:
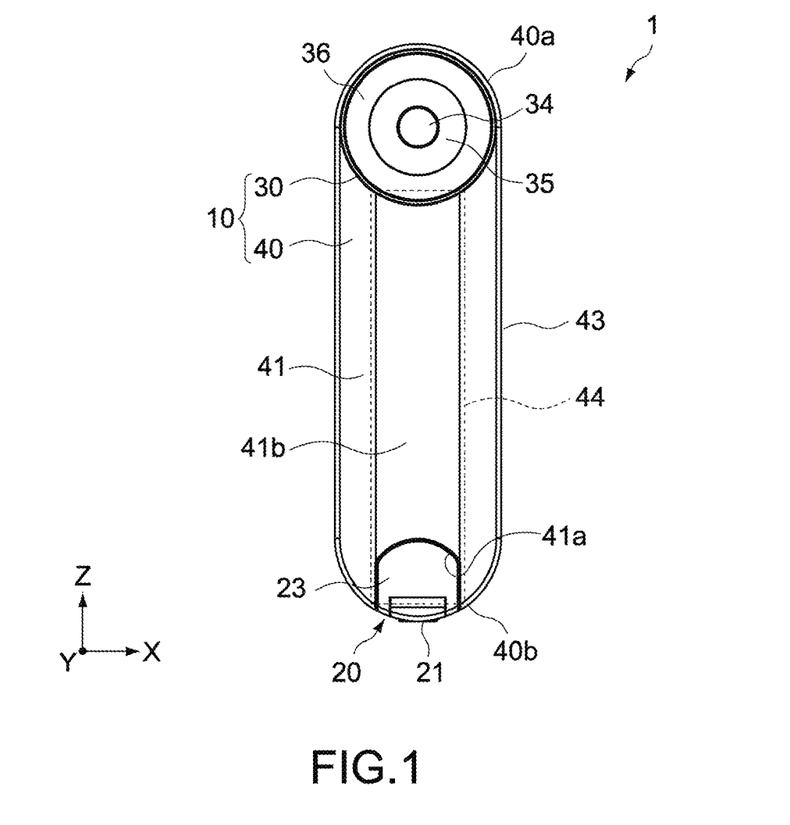
FIG. 1 A front view of an image pickup apparatus according to an embodiment of the present technology.
Figure 2:
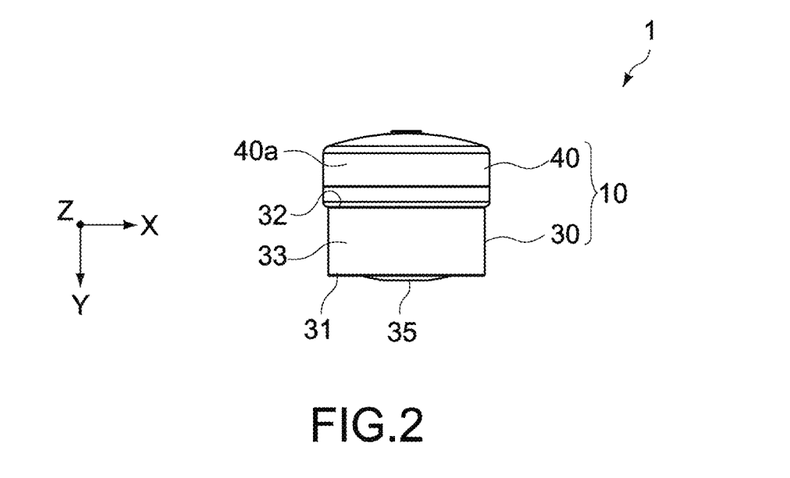
FIG. 2 A plan view of the image pickup apparatus.
Figure 3:
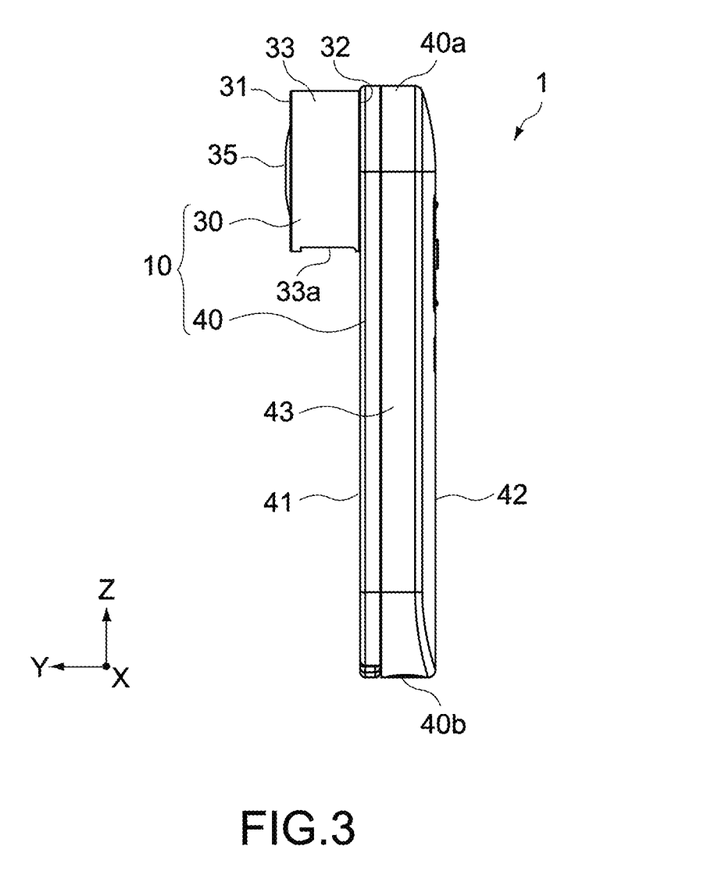
FIG. 3 A right-hand side view of the image pickup apparatus.
Figure 4:
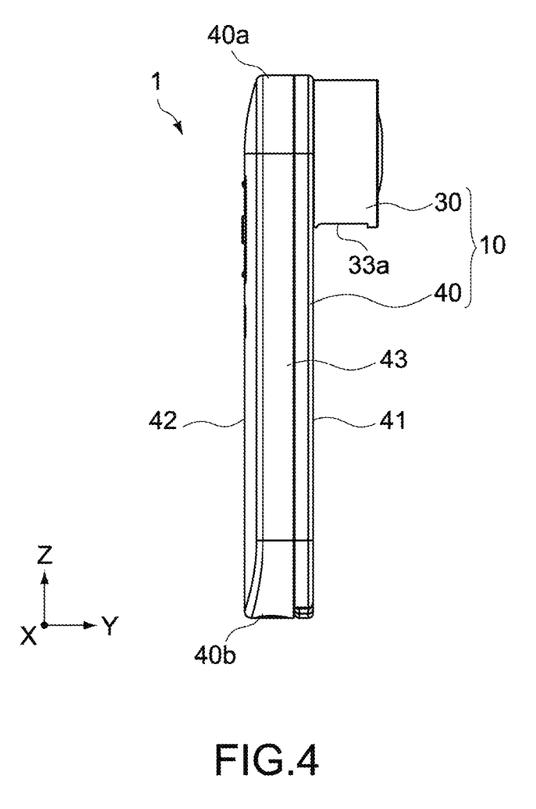
FIG. 4 A left-hand side view of the image pickup apparatus.
Figure 5:
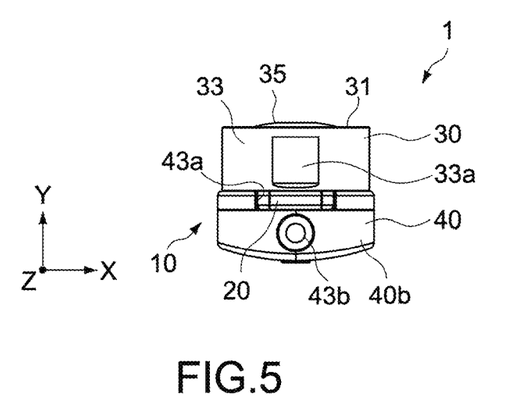
FIG. 5 A bottom view of the image pickup apparatus.
Figure 6:
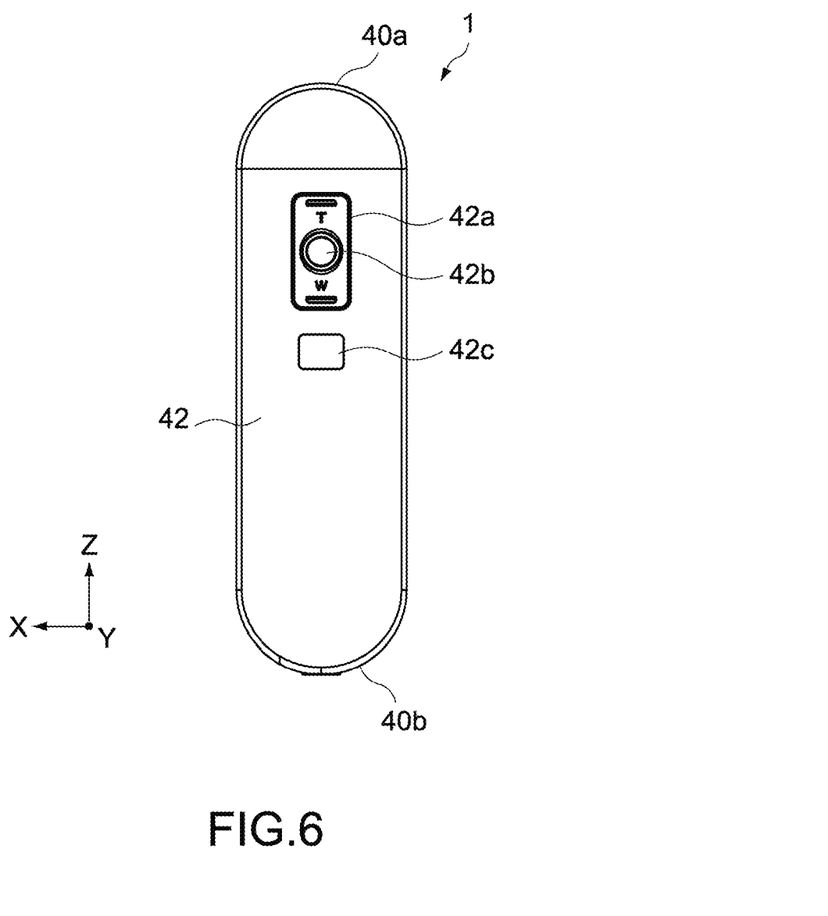
FIG. 6 A back view of the image pickup apparatus.
Figure 7:
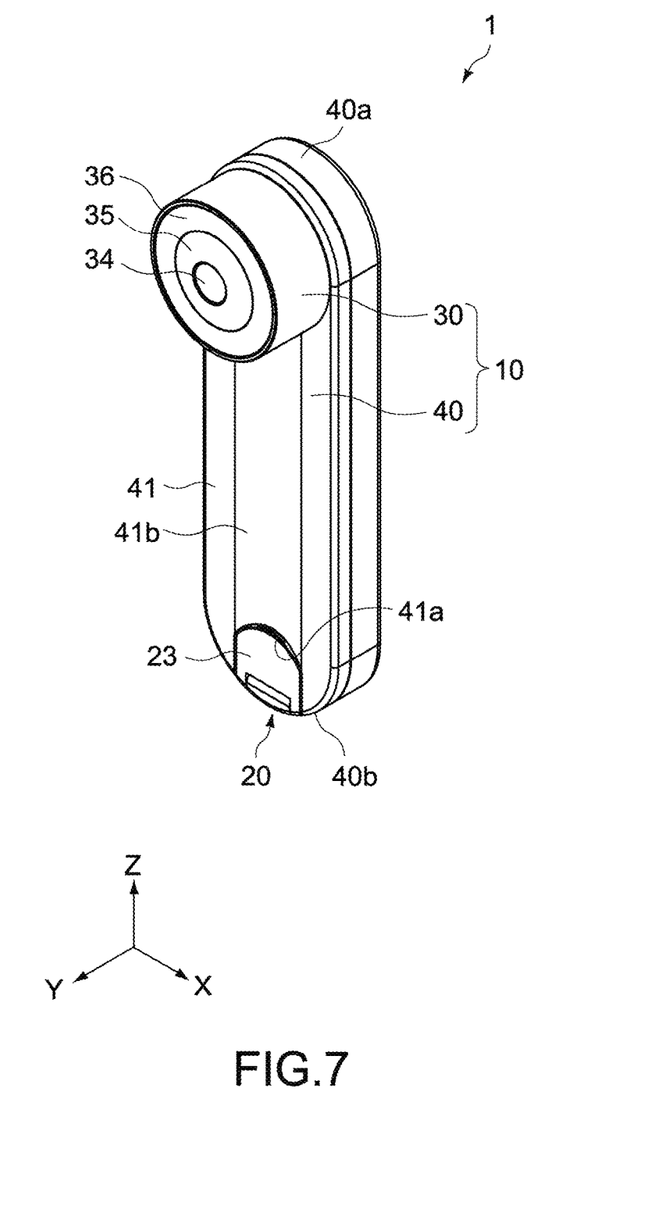
FIG. 7 A perspective view of the image pickup apparatus.
Figure 8:
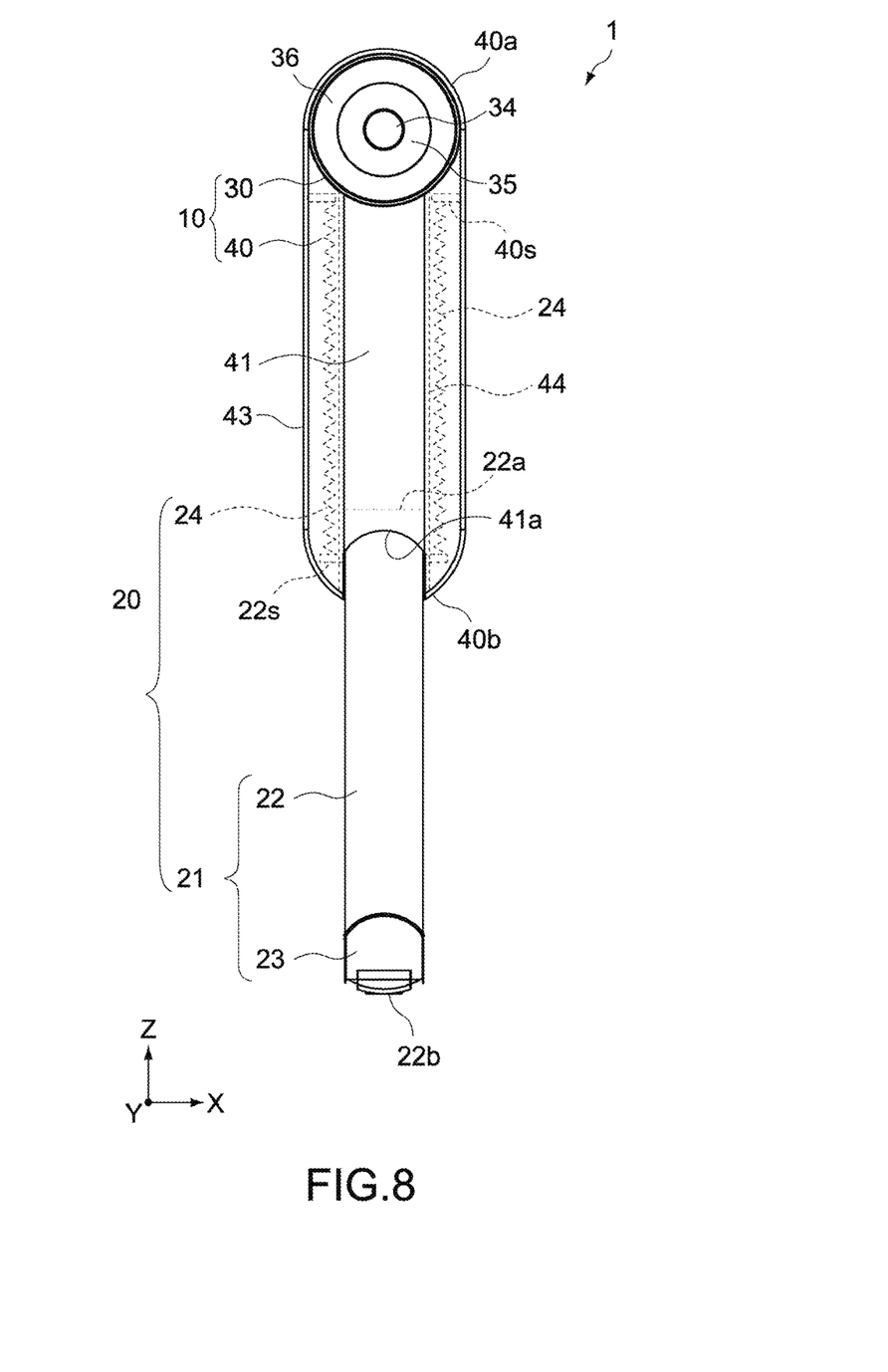
FIG. 8 A front view for explaining an operation example of the image pickup apparatus.
Figure 9:
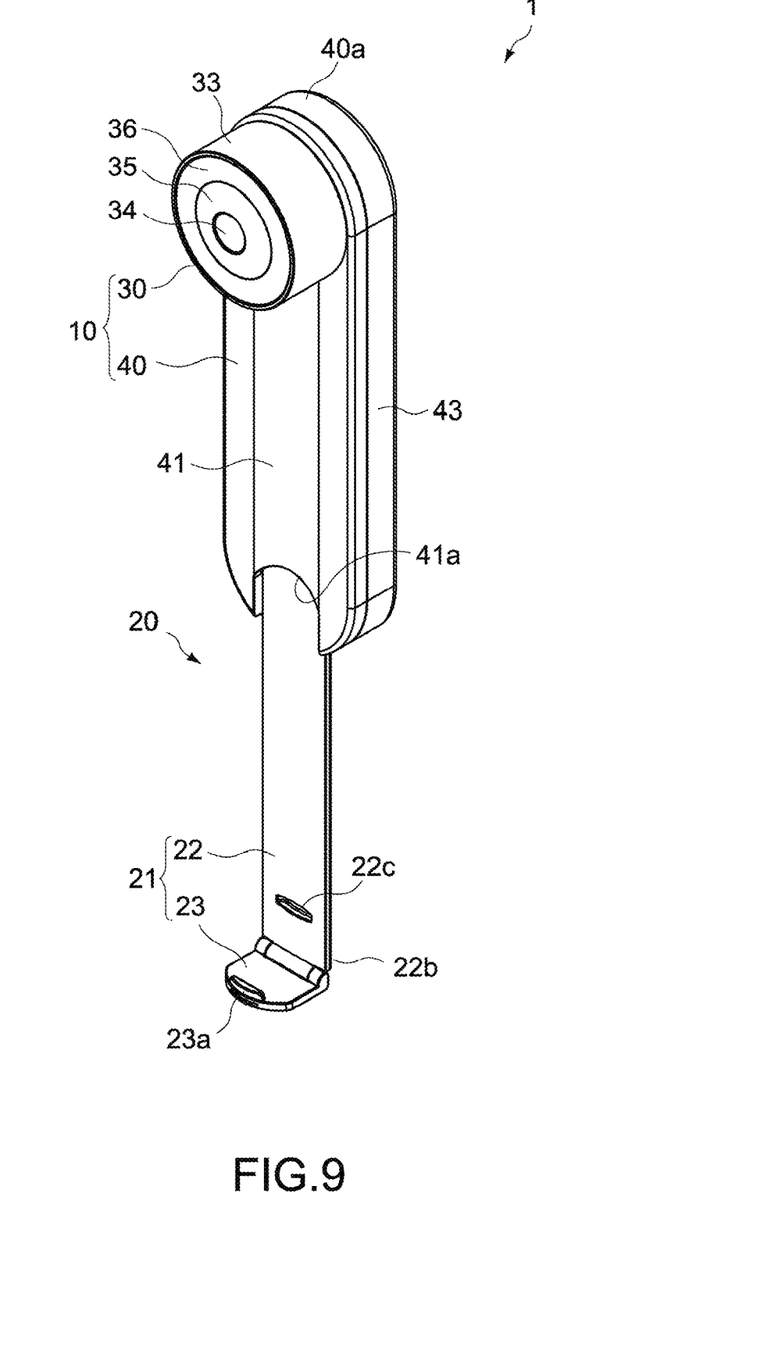
FIG. 9 A perspective view for explaining the operation example of the image pickup apparatus.
Figure 10:
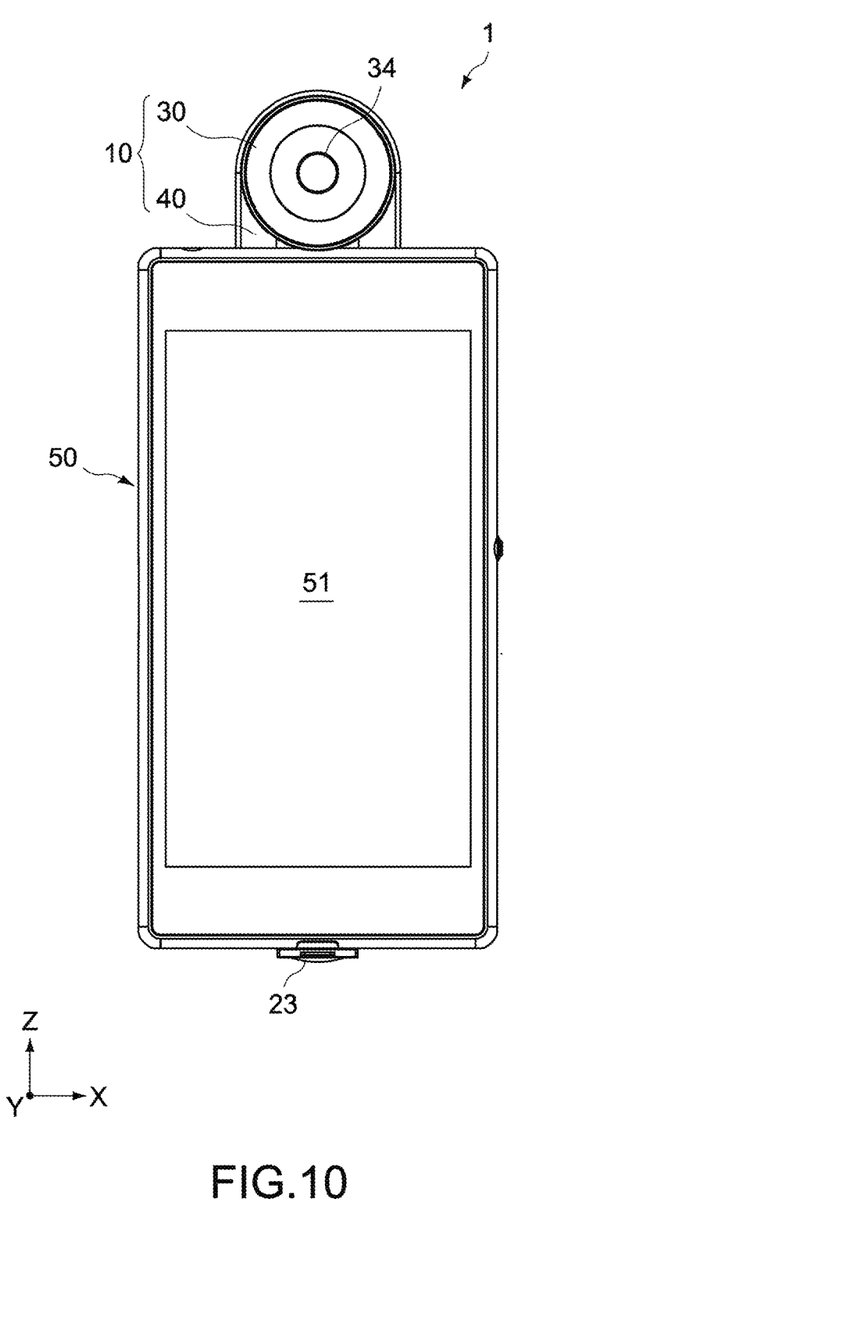
FIG. 10 A front view showing a usage example of the image pickup apparatus.
Figure 11:
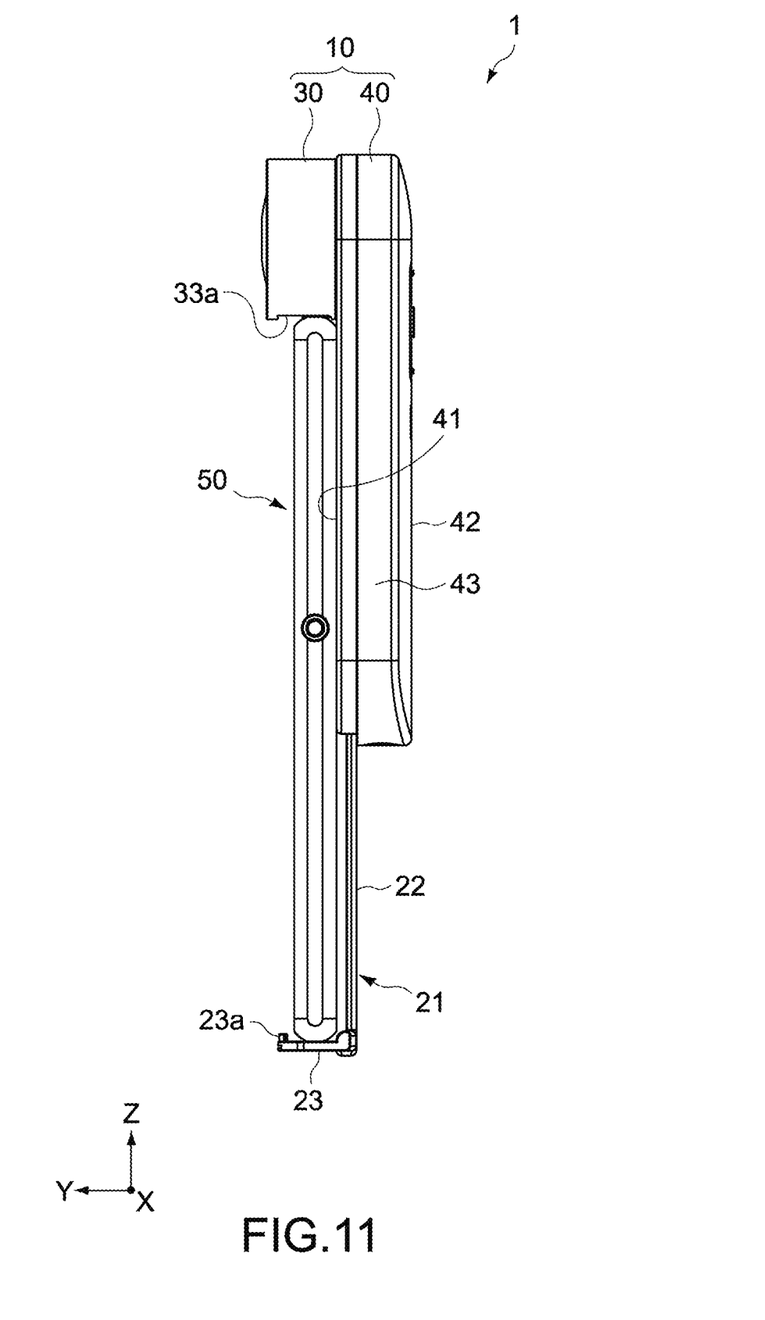
FIG. 11 A side view showing the usage example of the image pickup apparatus.
Figure 12:
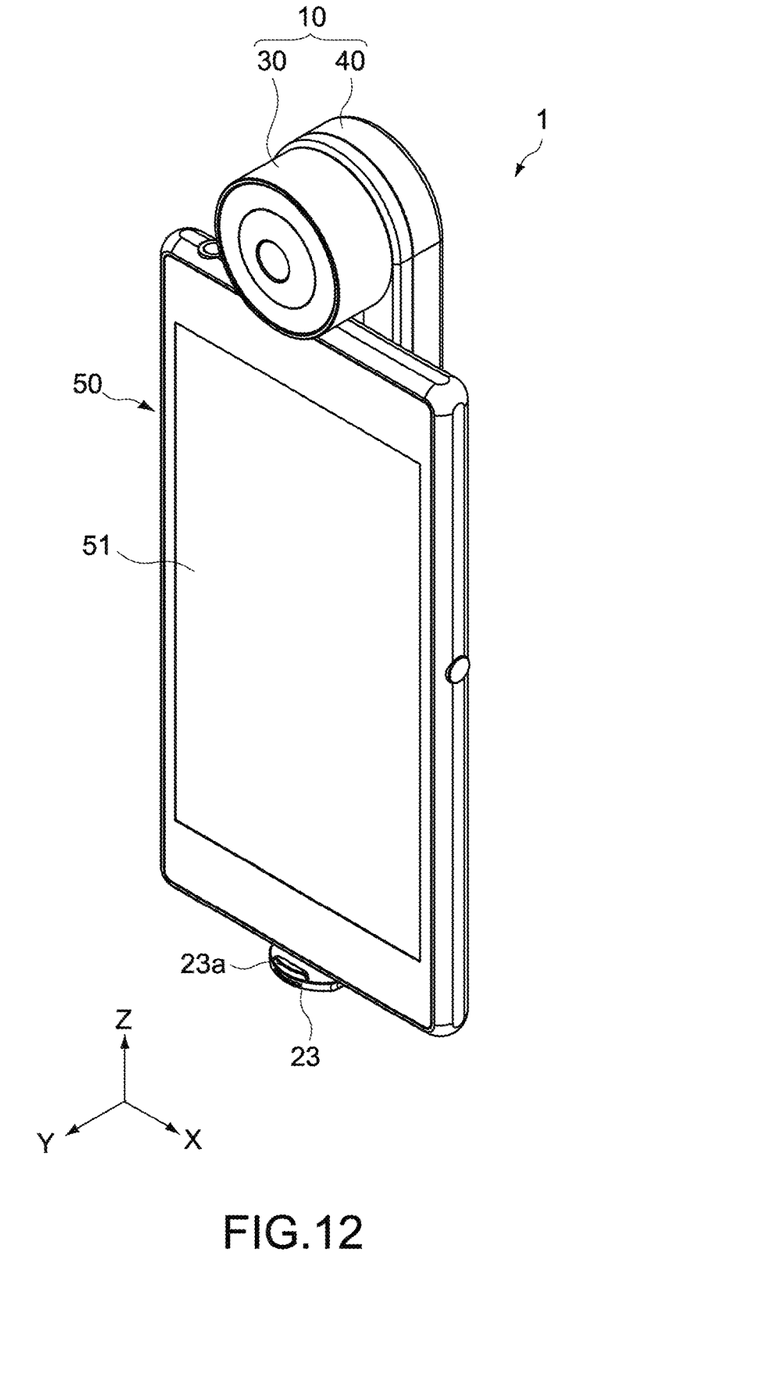
FIG. 12 A perspective view showing the usage example of the image pickup apparatus.

FIGS. 1 to 7 each show an image pickup apparatus according to the embodiment of the present technology. FIG. 1 is a front view, FIG. 2 is a plan view, FIG. 3 is a right-hand side view, FIG. 4 is a left-hand side view, FIG. 5 is a bottom view, FIG. 6 is a back view, and FIG. 7 is a front perspective view. Further, FIGS. 8 and 9 are respectively a front view and perspective view for explaining an operation example of the image pickup apparatus. FIGS. 10 to 12 are respectively a front view, side view, and perspective view showing a usage example of the image pickup apparatus.

It should be noted that the X-, Y-, and Z-axis directions in the figure respectively indicate three axial directions orthogonal to one another. The X-axis direction corresponds to a lateral direction, the Y-axis direction corresponds to a longitudinal direction, and the Z-axis direction corresponds to a height direction.

The image pickup apparatus 1 of this embodiment can not only be used independently but also in combination with a mobile terminal 50 as a member to be attached or an external display apparatus as shown in FIGS. 10 to 12.

[Configuration of Image Pickup Apparatus]

The image pickup apparatus 1 of this embodiment includes a main body 10 and a movable unit 20.

Hereinafter, configurations of the main body 10 and the movable unit 20 will be described.

(Main Body)

The main body 10 configures an image pickup unit including a lens tube portion 30 and a casing portion 40.

The casing portion 40 has a longitudinal direction in the Z-axis direction. The lens tube portion 30 is provided at an end portion 40a (first end portion) as one of the end portions of the casing portion 40 in the longitudinal direction, and the movable unit 20 is provided at the other end portion 40b (second end portion).

The casing portion 40 includes a front surface portion (first surface) on an image pickup direction (+Y direction) side, a back surface portion 42 (second surface) on the other side, and a side surface portion 43 provided between the front surface portion 41 and the back surface portion 42.

In this embodiment, outer shapes of the front surface portion 41 and the back surface portion 42 are each an oval having a long axis in the Z-axis direction, though of course not limited thereto. The front surface portion 41 has a flat surface and includes a concave groove 41b (FIGS. 1 and 7) formed with a predetermined width at a center portion thereof in the Z-axis direction. On the other hand, the back surface portion 42 is formed by a partially-cylindrical curve having an axial center in the Z-axis direction.

The lens tube portion 30 is coupled to the end portion 40a side of the front surface portion 41. On the other hand, a to-be-engaged portion 41a capable of engaging with the movable unit 20 is formed on the end portion 40b side of the front surface portion 41. The to-be-engaged portion 41a is typically configured as a concave portion formed by partially notching the end portion 40b of the front surface portion 41.

On the back surface portion 42, for example, as a surface of the main body 10 on a side different from the image pickup direction (+Y direction), a photograph operation portion including a zoom switch 42a and a shutter button 42b and a battery display portion 42c are provided as shown in FIG. 6. The shutter button 42b is constituted of a button that executes autofocus when the button is pressed halfway and starts photographing when the button is pressed all the way. The battery display portion 42c displays a remaining battery charge.

In place of or in addition to the battery display portion 42c, a framing image display screen may be provided. The zoom switch 42a, the shutter button 42b, and the display portion 42c do not always need to be arranged in the back surface portion 42 and may alternatively be arranged on the front surface portion 41 or the side surface portion 43.

On the end portion 40b side of the side surface portion 43, an opening 43a is formed as shown in FIG. 5. An accommodation portion 44 (FIG. 1) capable of accommodating a part (movable portion 21) of the movable unit 20 is formed from the opening 43a to an inner portion of the casing portion 40. The accommodation portion 44 is typically configured as a space portion that has a longitudinal direction in the Z-axis direction and is formed from the opening 43a toward the end portion 40a side along the Z-axis direction. The accommodation portion 44 may extend to a position right under the lens tube portion 30.

Further, as shown in FIG. 5, a tripod attachment hole 43b is formed at the end portion 40b on the other side of the end portion 40a connected to the lens tube portion 30 in the main body 10. With this configuration, photographing can be performed while the image pickup apparatus 1 is attached to a tripod. The tripod attachment hole 43b may be omitted.

Although not shown, the casing portion 40 includes therein a control unit, a communication unit, a battery, an external storage medium, and the like.

The control unit functions as a control processing unit that controls the respective units of the image pickup apparatus 1 and controls the respective units based on instruction input signals and the like corresponding to user input operations made via the button and switch described above.

The communication unit includes a function for performing wireless communication with external electronic apparatuses using NFC (Near Field Communication), WIFI (Wireless Fidelity), wireless LAN (Local Area Network), and the like. Accordingly, for example, captured data of images, videos, and the like taken by the image pickup apparatus 1 can be displayed on or stored in the mobile terminal 50 (external display apparatus). It also becomes possible to perform various operations of the image pickup apparatus 1, such as a photographing operation and a zoom operation, by operating the mobile terminal 50. Therefore, it is desirable to use a material that does not inhibit wireless communication with an external electronic apparatus, such as a synthetic resin, for a member configuring an outer surface of the casing portion 40.

The battery is typically configured by a secondary battery capable of being recharged repetitively, such as a lithium-ion battery. Typically used as the external storage medium is a card-type storage medium including a semiconductor memory capable of storing image data acquired by an image pickup device incorporated in the lens tube portion 30.

An audio device such as a speaker and a microphone may additionally be provided in the casing portion 40.

The lens tube portion 30 has a cylindrical shape including a tip end portion 31, a base end portion 32, and a circumferential portion 33 formed between the tip end portion 31 and the base end portion 32. The shape of the lens tube portion 30 is not limited in particular, and a cuboid shape or other shapes may be used instead, for example. The lens tube portion 30 is coupled to the front surface portion 41 on the end portion 40a side of the casing portion 40 at the base end portion 32 thereof.

A photographing lens 34 exposed from the tip end portion 31 is arranged inside the lens tube portion 30. The photographing lens 34 includes a zoom lens movable in an optical axis direction (Y-axis direction). Further, the lens tube portion 30 includes an image pickup device therein, and an object image imaged by the photographing lens 34 is photoelectrically converted by the image pickup device so as to generate image signals. The image pickup device does not need to be provided inside the lens tube portion 30 and may alternatively be provided inside the casing portion 40.

The lens tube portion 30 may be configured to be rotatable about the optical axis with respect to the casing portion 40. With this configuration, the image pickup device inside the lens tube portion 30 can similarly be rotated with the lens tube portion 30. Accordingly, a desired image pickup posture can be obtained without rotating the casing portion 40.

The lens tube portion 30 may be capable of tilting (tilt) within a predetermined angle range in a predetermined direction with respect to the casing portion 40. Accordingly, a desired image pickup direction can be obtained without rotating the casing portion 40.

The lens tube portion 30 includes a mirror surface portion provided on a circumference of the photographing lens 34.

In this embodiment, as the mirror surface portion, an annular convex mirror portion 35 is provided at the tip end portion 31 of the lens tube portion 30 along the circumference of the photographing lens 34. The convex mirror portion 35 is formed of a material having a high light reflectivity, typically a metal member such as aluminum and silver, a metal foil, or the like. The convex mirror portion 35 has a shape that is convex from the circumferential portion toward the center in the image pickup direction (+Y direction). Accordingly, when the user (operator) performs self-shooting, the user can visually check his/her own figure (typically, user's face) reflected on the convex mirror portion 35 and perform a photographing operation while checking a relative position with respect to the photographing lens 34.

Further, since the convex mirror portion 35 is provided so as to surround the photographing lens 34, photographing can be performed while eyes and face of the user is directed in the optical axis direction. In addition, since the convex mirror portion 35 is convex in the image pickup direction, a full-length figure of the user can be taken. It should be noted that the shape of the convex mirror portion 35 is not limited in particular, and the convex mirror portion 35 may instead be a flat mirror portion orthogonal to the image pickup direction, for example. Moreover, the convex mirror portion 35 may be omitted.

Furthermore, a light-emitting portion 36 capable of irradiating light in the image pickup direction is arranged around the convex mirror portion 35. The light-emitting portion 36 is constituted of a light-emitting diode, for example. An emission color of the light-emitting portion 36 is not limited in particular, but is typically white. The light-emitting portion 36 may be used as strobe light, or in the case of self-shooting, used for the purpose of brightening the user's face so as to obtain a favorable flesh color. It should be noted that the light-emitting portion 36 may be omitted.

As shown in FIGS. 2 and 3, an engagement portion 33a (first engagement portion) is provided in the circumferential portion 33 of the lens tube portion 30. The engagement portion 33a is configured to be capable of holding the mobile terminal 50 in cooperation with the movable unit 20 to be described later.

The engagement portion 33a is formed in an area of the circumferential portion 33 of the lens tube portion 30, that faces the end portion 40b side of the casing portion 40. The engagement portion 33a is typically formed by a flat surface or a curved dent formed so as to be capable of holding the mobile terminal 50.

The configuration of the engagement portion 33a is not limited to the example described above and is not limited in particular as long as it can prevent the mobile terminal 50 that is being held from falling off. For example, the engagement portion 33a may be a protrusion protruding from the circumferential portion 33 toward the movable unit 20 side. Alternatively, a member formed of a material having a high friction resistance against the mobile terminal 50 may be provided as the engagement portion 33a so that the mobile terminal 50 is held by a frictional force. It should be noted that the engagement portion 33a does not need to be formed as a special form in the circumferential portion 33 of the lens tube portion 30 and may be configured by a partial cylindrical surface of the circumferential portion 33.

The mobile terminal 50 is configured by an electronic apparatus that includes a display screen 51 and is capable of displaying image data output from the image pickup device on the display screen 51 by performing wireless communication with the communication unit of the image pickup apparatus 1. A typical example of the mobile terminal 50 is a cell phone such as a smartphone.

[Configuration of Movable Unit]

The movable unit 20 includes a movable portion 21 and a bias member 24.

The movable portion 21 is connected to the casing portion 40 while being linearly movable between an accommodation position where it is accommodated in the casing portion 40 as shown in FIG. 7 (first position) and a drawing position where it is apart from the end portion 40b of the casing portion 40 in the Z-axis direction as shown in FIGS. 8 and 9 (second position). The movable portion 21 is configured as an attachment portion capable of holding the mobile terminal 50 in cooperation with the lens tube portion 30.

As shown in FIGS. 8 and 9, the movable portion 21 includes a shaft-like member 22 and an engagement member (second engagement portion or holding portion). The movable portion 21 is provided in the main body 10 while being extendable from the end portion 40b of the casing portion 40.

The shaft-like member 22 includes a base end portion 22a as an end portion on the casing portion 40 side and a tip end portion 22b on the other side of the base end portion 22a. The shaft-like member 22 is configured by a plate-like member having a width direction in the X-axis direction, a thickness direction in the Y-axis direction, and a longitudinal direction in the Z-axis direction, but the shaft-like member 22 may also take other shapes such as a cylinder and a rectangular cylinder.

The engagement member 23 is configured by a plate-like member coupled to the tip end portion 22b of the shaft-like member 22 via a hinge. The engagement member 23 is configured to be rotatable by substantially 90° between an accommodation posture at which it is folded on the shaft-like member 22 as shown in FIGS. 7 and 8 (first posture) and a development posture at which it substantially forms a right angle with the shaft-like member 22 as shown in FIG. 9 (second posture).

At the accommodation posture, the engagement member 23 engages with the to-be-engaged portion 41a formed at the end portion 40b of the casing portion 40 at the accommodation position. At this time, as shown in FIG. 1, by forming the engagement member 23 in a size and shape with which the entire engagement member 23 is accommodated in the area of the to-be-engaged portion 41a, the movable portion 21 is prevented from protruding from the end portion 40b of the casing portion 40.

On the other hand, at the development posture, the engagement member 23 is configured such that it opposes the lens tube portion 30 in the Z-axis direction and is capable of holding the mobile terminal 50 in cooperation with the engagement portion 33a of the lens tube portion 30 at the drawing position.

The shape and thickness of the engagement member 23 are not limited in particular as long as it can hold the mobile terminal 50 in cooperation with the engagement portion 33a. The engagement member 23 may also take other shapes or configurations for stably holding the mobile terminal 50. For example, as shown in FIGS. 9 and 11, a protrusion 23a for improving holding stability of the mobile terminal 50 is provided at a tip end portion of the engagement member 23 while protruding toward the main body 10 side at the development posture. In this case, as shown in FIG. 9, an accommodation groove 22c capable of accommodating the protrusion 23a at the accommodation posture is formed on the shaft-like member 22.

A drawing length (movement distance) of the movable portion 21 from the accommodation position to the drawing position is not limited in particular as long it can hold the mobile terminal 50 of a predetermined size. Typically, stoppers 22s (FIG. 8) that prevent the movable portion 21 from falling off from the opening 43a that is in communication with the accommodation portion 44 are provided in the vicinity of the base end portion 22a of the shaft-like member 22. In this case, a maximum drawing length of the movable portion 21 to the drawing position corresponds to a length from the accommodation position to a position where the drawing operation of the movable portion 21 is restricted by the stoppers 22s.

As shown in FIG. 8, for example, the bias member 24 is configured by a plurality of elastic members arranged between supporting portions 40s provided inside the casing portion 40 and the stoppers 22s of the movable portion 21. The bias member 24 biases the movable portion 21 toward the accommodation position. The bias member 24, the supporting portions 40s, and the stopper portions 22s configure the "bias mechanism" of the movable portion 21.

The bias member 24 applies a clamping force corresponding to an elastic force of the bias member 24 to the mobile terminal 50 arranged between the lens tube portion 30 (engagement portion 33a) and the movable portion (engagement member 23). Accordingly, the mobile terminal 50 can be held stably. Moreover, when the movable portion 21 is at the accommodation position, the bias member 24 prevents the movable portion 21 from inadvertently popping out of the casing portion 40. Accordingly, it becomes possible to carry the image pickup apparatus 1 while protecting the movable portion 21 from breakages and the like.

The bias member 24 is not limited to the example where it is configured by an extension spring as shown in FIG. 11, and the bias member 24 may instead be configured by a compression spring. The bias member 24 is not limited in particular as long as it can bias the movable portion 21 as described above and may be configured by other elastic members such as a plate spring and a rubber member.

[Usage Example of d Image Pickup Apparatus]

Hereinafter, a typical usage example of the image pickup apparatus 1 will be described.

The image pickup apparatus 1 of this embodiment is used as a still image photographing camera, a moving image shooting video camera, and the like. In this case, the image pickup apparatus 1 may be used independently or used in cooperation with a mobile terminal such as a smartphone.

(Independent Usage Example)

As shown in FIGS. 1 to 7, the image pickup apparatus 1 is carried and used while the movable portion 21 is accommodated in the casing portion 40. At this time, the engagement member 23 of the movable portion 21 takes an accommodation posture to be engaged with the to-be-engaged portion 41a of the casing portion 40. Accordingly, the casing portion 40 can be handled without causing the movable portion 21 to protrude from the end portion 40b of the casing portion 40, and lowering of operability due to the movable portion 21 protruding during use can be prevented from occurring.

The image pickup apparatus 1 may be used while the longitudinal direction of the casing portion 40 is directed in either the longitudinal direction or the lateral direction. The image pickup apparatus 1 may be used for photographing objects other than the user (photographer) or used for photographing the user him/herself.

When the image pickup apparatus 1 is used to photograph the user him/herself, the user can photograph while checking his/her own figure on the convex mirror portion 35 provided in the lens tube portion 30, and thus it becomes possible to easily acquire an image intended by the user. Moreover, when a part of the fingers (typically, thumb) of the user holding the image pickup apparatus 1 is positioned on the concave groove 41b of the front surface portion 41 of the casing portion 40, since a movement of the finger in the X-axis direction is absorbed or relieved by the concave groove, a stable still image without a hand movement can be obtained.

(Usage Example when Used in Cooperation with Mobile Terminal)

The image pickup apparatus 1 can be used in combination with a mobile terminal such as a smartphone. In this case, the mobile terminal 50 is attached to the image pickup apparatus 1 via the movable unit 20 functioning as the attachment portion.

In attaching the mobile terminal 50 to the image pickup apparatus 1, the movable portion 21 at the accommodation position is first drawn out in the Z-axis direction, and the engagement member 23 is rotated to be set at the development posture from the accommodation posture. Typically, it is favorable for the movable portion 21 to be drawn out by a distance larger than the width or length of the mobile terminal 50.

Next, as shown in FIGS. 10 to 12, the mobile terminal 50 is brought into contact with the front surface portion 41 of the casing portion 40 while the display screen 51 faces the image pickup direction (+Y direction), and an upper end portion of the mobile terminal 50 is brought into contact with the engagement portion 33a formed on the circumferential portion 33 of the lens tube portion 30. Then, the movable portion 21 is moved toward the casing portion 40 side so that the engagement member 23 is brought into contact with a lower end portion of the mobile terminal 50.

The mobile terminal 50 is attached to the image pickup apparatus 1 as described above. Since the movable unit 20 includes the bias member 24 that biases the movable portion 21 toward the casing portion 40 side, the mobile terminal 50 can be stably held between the engagement portion 33a of the lens tube portion 30 and the engagement member 23 of the movable portion 21 with a predetermined clamping force. End surfaces of the mobile terminal 50 supported by the engagement portion 33a and the engagement member 23 are not limited to both end portions on short sides shown in FIGS. 10 to 12 and may instead be both end portions on long sides.

Since the mobile terminal 50 attached to the image pickup unit (main body 10) via the attachment portion (movable portion 21) is provided in the vicinity of the casing portion 40, near-field communication (NFC) can be performed between the image pickup apparatus 1 and the mobile terminal 50. As a result, it becomes possible to realize usage patterns such as transmitting an object image acquired by the image pickup apparatus 1 to the mobile terminal 50, causing the object image to be displayed on the display screen 51 of the mobile terminal 50, and transmitting the object image to other electronic apparatuses via the Internet using a communication function of the mobile terminal 50 (tethering).

Further, since the mobile terminal 50 is held while the display screen 51 of the mobile terminal 50 faces the image pickup direction, the user can photograph him/herself while checking an object image on the display screen 51. Accordingly, a desired image of the user can be obtained by self-shooting.

Also in this case, it is possible to adjust the relative positional relationship between the user him/herself and the photographing lens 34 while looking at the annular convex mirror portion 35 provided in the lens tube portion 30. Further, by causing the light-emitting portion 36 to emit light, the user's face and the like can be adjusted to a desired brightness.

The embodiment of the present technology has been described heretofore, but the present technology is not limited to the embodiment above and can of course be variously modified without departing from the gist of the present technology.

The embodiment above takes the mobile terminal 50 as an example of the member to be attached. However, a reflector capable of reflecting a user's own figure, such as a hand mirror, may be used instead. Accordingly, a desired image of the user can be obtained by self-shooting.

Figure 13:
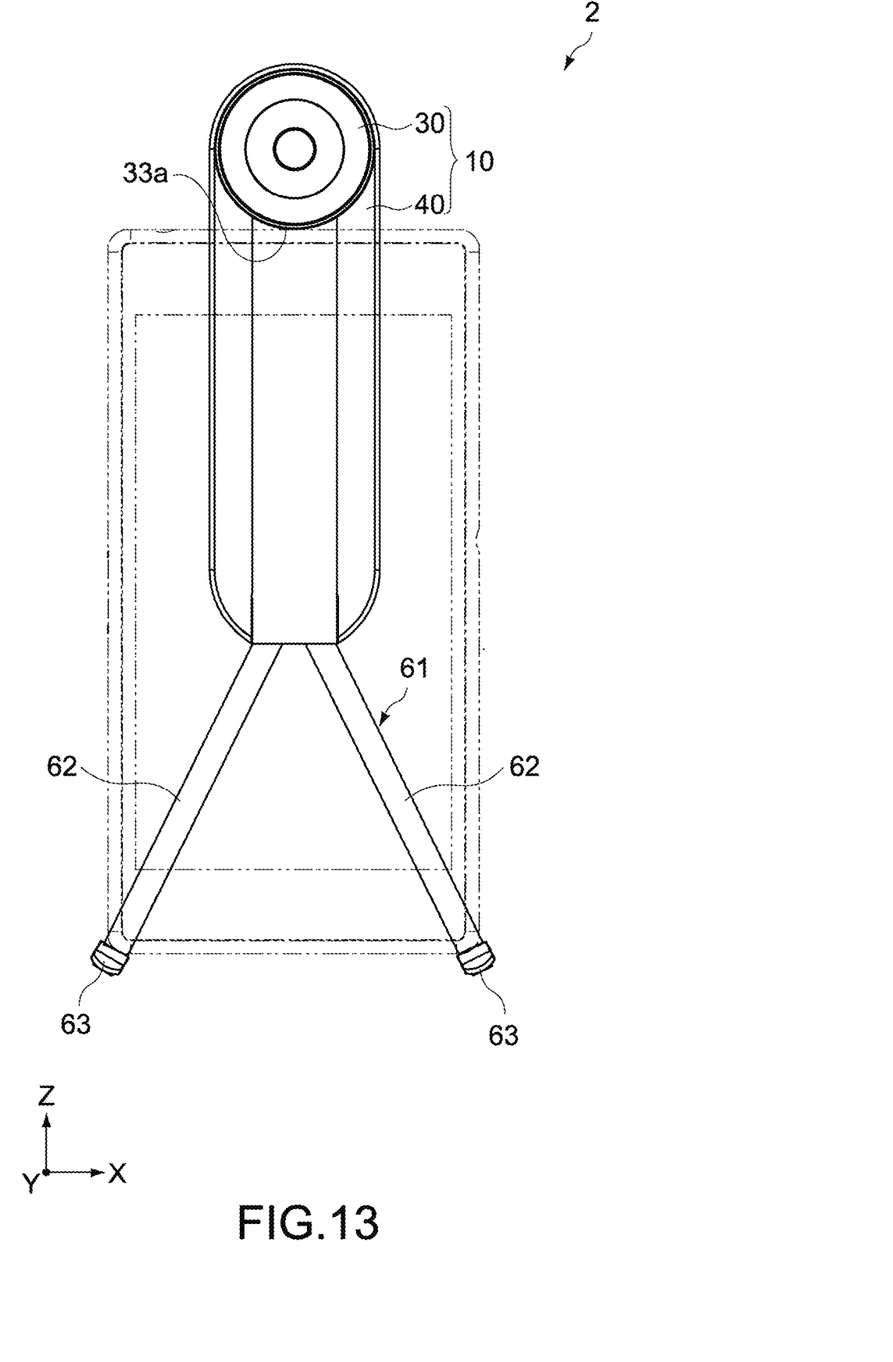
FIG. 13 A front view showing a modified example of a configuration of the differential image pickup apparatus.

Moreover, while an independent shaft-like or plate-like member is used as the movable portion 21 in the embodiment above, the movable portion 21 can be configured by a plurality of those. For example, as in an image pickup apparatus 2 shown in FIG. 13, a movable portion 61 including a plurality of shaft-like members 62 each including an engagement member 63 capable of holding one of two corner portions at lower ends of the mobile terminal 50, may be configured. In this case, an effect of further improving the holding stability of the mobile terminal 50 is expected to be obtained.

Furthermore, instead of or in addition to the configuration of drawing out the movable portion 21 from the casing portion 40 by a sliding operation, a configuration in which the movable portion 21 is extended from the casing portion 40 by being developed from the folded state at the accommodation position may be adopted. In addition, the entire movable portion may be configured by an elastic member such as a synthetic resin and a spring member.

Furthermore, the casing portion 40 and the lens tube portion 30 are formed integrally in the embodiment above, but the relative positions of the lens tube portion and the casing portion may become variable. In other words, it is possible to configure the casing portion as a part of the movable unit and hold the member to be attached such as a mobile terminal between the lens tube portion and the casing portion.

It should be noted that the present technology may also take the following configurations.

(1) An image pickup apparatus, including:

a main body including a lens tube portion; and a movable unit including a movable portion and a bias portion that biases the movable portion toward the lens tube portion, the movable portion having a relative position with respect to the lens tube portion being variable along an axial direction orthogonal to an optical axis of the lens tube portion.

(2) The image pickup apparatus according to (1), in which the main body further includes a casing portion that has a longitudinal direction in the axial direction orthogonal to the optical axis and is capable of accommodating the movable portion.

(3) The image pickup apparatus according to (2), in which the lens tube portion is provided at one of end portions of the casing portion in the longitudinal direction, and the movable portion is extendable from the other one of the end portions of the casing portion in the longitudinal direction.

(4) The image pickup apparatus according to (2) or (3), in which
the movable portion is configured by a shaft-like member that has a longitudinal direction in the axial direction orthogonal to the optical axis and is movable along the second axial direction, and
the bias portion includes an elastic member fixed between the shaft-like member and the casing.
(5) The image pickup apparatus according to (3) or (4), in which
the movable portion further includes an engagement portion and is movable between a first position at which the engagement portion engages with the other one of the end portions and a second position at which the engagement portion is positioned apart from the other one of the end portions in the axial direction orthogonal to the optical axis.
(6) The image pickup apparatus according to (5), in which
the engagement portion is configured to be switchable between a first posture at which the engagement portion engages with the other one of the end portions at the first position and a second posture at which the engagement portion can hold a member to be attached in cooperation with the lens tube portion at the second position.
(7) The image pickup apparatus according to any one of (1) to (6), in which
the lens tube portion includes a lens and a mirror surface portion in a circumference of the lens.
(8) The image pickup apparatus according to (7), in which
the mirror surface portion is an annular convex mirror portion that is convex in an image pickup direction.
(9) The image pickup apparatus according to any one of (1) to (8), in which
the lens tube portion further includes a light-emitting portion that irradiates light in an image pickup direction.
(10) The image pickup apparatus according to any one of (1) to (9), in which
the main body further includes a photograph operation portion that is provided on a surface in a direction different from an image pickup direction.
(11) The image pickup apparatus according to any one of (1) to (10), in which
the main body further includes a tripod hole formed at an end portion thereof on the other side of an end portion connected to the lens tube portion.
(12) The image pickup apparatus according to any one of (1) to (11), further including
a communication unit capable of transmitting captured data to an external display apparatus.
(13) The image pickup apparatus according to (12), in which
the movable portion further includes a holding portion capable of holding the external display apparatus in cooperation with the lens tube portion.
(14) An image pickup apparatus, including:
an image pickup unit including a lens tube portion; and
an attachment portion that is movable along an axial direction orthogonal to an optical axis of the lens tube portion, includes a holding portion capable of holding a member to be attached in cooperation with the lens tube portion, and is connected to the image pickup unit.

DESCRIPTION OF SYMBOLS 1 image pickup apparatus
10 main body
20 movable unit
21 movable portion
22 shaft-like member
23 engagement member
24 bias member
30 lens tube portion
33a engagement portion
34 photographing lens
35 convex mirror portion
36 light-emitting portion
40 casing portion
50 mobile terminal

The invention claimed is:
1. An image pickup apparatus, comprising:
a main body including a lens tube portion, wherein the lens tube portion comprises a first engagement portion; and
a movable unit including a movable portion and a bias portion, wherein the bias portion is configured to bias the movable portion toward the lens tube portion, wherein a relative position of the movable portion with respect to the lens tube portion is variable along an axial direction orthogonal to an optical axis of the lens tube portion, and
wherein the first engagement portion is configured to hold a member in cooperation with the movable unit.
2. The image pickup apparatus according to claim 1, wherein
the main body further includes a casing portion that has a longitudinal direction in the axial direction, and wherein the casing portion is configured to accommodate the movable portion.
3. The image pickup apparatus according to claim 2, wherein
the casing portion has two end portions,
wherein the lens tube portion is, in the longitudinal direction, at a first end portion of the two end portions, and
the movable portion is configured to extend, in the longitudinal direction, from a second end portion of the two end portions.
4. The image pickup apparatus according to claim 2, wherein
the movable portion includes a shaft-like member that has the longitudinal direction in the axial direction, and wherein the shaft-like member is configured to move along the axial direction, and
the bias portion includes an elastic member between the shaft-like member and the casing portion.
5. The image pickup apparatus according to claim 3, wherein
the movable portion includes a second engagement portion, and wherein the movable portion is configured to move between a first position at which the second engagement portion engages with the second end portion and a second position at which the second engagement portion is positioned apart from the second end portion in the axial direction orthogonal to the optical axis.
6. The image pickup apparatus according to claim 5, wherein
the second engagement portion is configured to switch between a first posture at which the second engagement portion engages with the second end portion at the first position and a second posture at which the second engagement portion can hold the member in cooperation with the lens tube portion at the second position.
7. The image pickup apparatus according to claim 1, wherein the lens tube portion further comprises a lens and a mirror surface portion in a circumference of the lens tube portion.

8. The image pickup apparatus according to claim 7, wherein
the mirror surface portion is an annular convex mirror portion that is convex in an image pickup direction.

9. The image pickup apparatus according to claim 1, wherein
the lens tube portion further comprises a light-emitting portion configured to irradiate light in an image pickup direction.

10. The image pickup apparatus according to claim 1, wherein the main body further includes a photograph operation portion and a casing portion,
wherein the photograph operation portion is on a surface of the casing portion, and
wherein the photograph operation portion is in a direction different from an image pickup direction.

11. The image pickup apparatus according to claim 1, wherein
the main body further includes a tripod hole and a casing portion, wherein the tripod hole is at a first end portion of the casing portion, and wherein the first end portion is opposite to a second end portion of the casing portion connected to the lens tube portion.

12. The image pickup apparatus according to claim 1, further comprising a communication unit configured to transmit captured data to an external display apparatus.

13. The image pickup apparatus according to claim 12, wherein
the movable portion further includes a holding portion configured to hold the external display apparatus in cooperation with the lens tube portion.

14. An image pickup apparatus, comprising:
an image pickup unit including a lens tube portion, wherein the lens tube portion comprises a first holding portion; and
an attachment portion connected to the image pickup unit, wherein the attachment portion is configured to move along an axial direction orthogonal to an optical axis of the lens tube portion,
wherein the attachment portion includes a second holding portion, and
wherein the first holding portion is configured to hold a member in cooperation with the second holding portion.

* * * * *